United States Patent
Borisavljevic

(10) Patent No.: US 7,965,053 B2
(45) Date of Patent: Jun. 21, 2011

(54) MEASUREMENT OF SPEED AND DIRECTION OF COASTING PERMANENT MAGNET SYNCHRONOUS MOTOR

(75) Inventor: Ana Borisavljevic, Marina Del Rey, CA (US)

(73) Assignee: International Rectifier Corporation, El Segundo, CA (US)

( * ) Notice: Subject to any disclaimer, the term of this patent is extended or adjusted under 35 U.S.C. 154(b) by 589 days.

(21) Appl. No.: 12/041,327

(22) Filed: Mar. 3, 2008

(65) Prior Publication Data

US 2008/0211440 A1 Sep. 4, 2008

Related U.S. Application Data

(60) Provisional application No. 60/892,663, filed on Mar. 2, 2007.

(51) Int. Cl.
*G01P 3/48* (2006.01)
*H02P 6/18* (2006.01)
(52) U.S. Cl. ............... 318/400.35; 318/400.31; 318/701
(58) Field of Classification Search ............. 318/400.31, 318/400.35, 800, 801, 701, 823; 361/23
See application file for complete search history.

(56) References Cited

U.S. PATENT DOCUMENTS

| | | | |
|---|---|---|---|
| 4,761,703 A * | 8/1988 | Kliman et al. | 361/23 |
| 5,051,680 A * | 9/1991 | Belanger | 318/701 |
| 5,327,053 A | 7/1994 | Mann et al. | |
| 5,334,917 A * | 8/1994 | Lind | 318/400.35 |
| 5,521,482 A * | 5/1996 | Lang et al. | 318/800 |
| 5,530,343 A * | 6/1996 | Bowers et al. | 324/173 |
| 5,534,763 A | 7/1996 | Williams et al. | |
| 5,563,980 A * | 10/1996 | Chen et al. | 388/811 |
| 6,034,493 A * | 3/2000 | Boyd et al. | 318/400.31 |
| 6,104,113 A | 8/2000 | Beifus | |
| 6,359,413 B1 * | 3/2002 | Schulz et al. | 318/701 |
| 6,555,977 B1 | 4/2003 | Du et al. | |
| 7,030,582 B2 | 4/2006 | Masino | |
| 7,126,301 B2 | 10/2006 | Nishihara et al. | |
| 7,138,776 B1 | 11/2006 | Gauthier et al. | |
| 7,141,949 B2 * | 11/2006 | Harwood | 318/400.35 |
| 2006/0197482 A1 * | 9/2006 | Harwood | 318/439 |
| 2007/0282461 A1 * | 12/2007 | Harwood | 700/14 |
| 2008/0211450 A1 * | 9/2008 | Yamada et al. | 318/801 |

OTHER PUBLICATIONS

Simon, Neil, "Determining speed for AC induction motors," A.O. Smith Electrical Products Company, 2004.
Borisavljevic, Ana et al, "Fan Drive Starting into Naturally Rotating Load by Sinusoidal Sensorless Permanent Magnet Motor Control," EPE-PEMC 2006 Portoroz, Slovenia, pp. 1190-1198.
Bimal Bose, "Power Electronics and Variable Frequency Drives," IEEE Computer Society Press, Oct. 1996, pp. 235-307.
"Permanent Magnet Synchronous Machine," Mathworks: SimPowerSystems library for Siumlink.

* cited by examiner

*Primary Examiner* — Paul Ip
(74) *Attorney, Agent, or Firm* — Farjami & Farjami LLP

(57) ABSTRACT

A method for determining the speed of rotation of an unpowered, coasting electric motor, driven, when powered, by an electronic inverter, and without activating switches of the inverter. The steps include determining an electrical frequency of a back emf signal generated at a terminal of the motor or switching node of the inverter when the motor is coasting and determining the mechanical motor frequency and thus speed of rotation by dividing the electrical frequency by the number of motor pole pairs.

15 Claims, 3 Drawing Sheets

PMSM motor controlled through a 3-phase switch-mode voltage source inverter.

PMSM motor controlled through a 3-phase switch-mode voltage source inverter.

MEASUREMENT OF SPEED AND DIRECTION OF COASTING PERMANENT MAGNET SYNCHRONOUS MOTOR

CROSS-REFERENCE TO RELATED APPLICATIONS

The present application claims the benefit and priority of U.S. Provisional Application Ser. No. 60/892,663 filed Mar. 2, 2007 and entitled MEASUREMENT OF HIGH SPEED FOR PERMANENT MAGNET SYNCHRONOUS MOTOR, the entire disclosure of which is hereby incorporated by reference.

BACKGROUND OF THE INVENTION

Motor drives are presently used in a vast range of applications such as fans, pumps, compressors and washing machines. Motor drives in these applications are required to have high efficiency, low noise and robustly stable operation.

In some fan applications, it is required that the speed and the direction of the naturally rotating (coasting, unpowered) motor be known prior to the start of active motor control. If the fan drive includes a position sensor to detect the position and direction of the motor, this is a relatively easy task since the speed and the direction of the motor can be determined based on the pulses from the position sensor. Recently, however, sensorless fan drives have been in demand primarily due to their lower cost and increased reliability. In these drives it is not straightforward to measure the speed prior to the start of active motor control.

SUMMARY OF THE INVENTION

The present invention provides a method to measure the speed and direction of rotation of a naturally rotating Permanent Magnet Synchronous Motor (PMSM) without engaging the active sensorless motor control.

According to the invention, the method comprises determining the speed of rotation of an unpowered, coasting electric motor driven, when powered, by an electronic inverter, and without activating switches of the inverter, the method comprising determining an electrical frequency of a back emf signal generated at a terminal of the motor or switching node of the inverter when the motor is coasting; and determining the mechanical motor frequency and thus speed of rotation by dividing the electrical frequency by the number of motor pole pairs.

According to a further aspect, the step of determining the electrical frequency comprises determining a time period between two successive waveform points, e.g., upward or downward zero crossings of the back emf signal at a terminal of the motor or switching node of the inverter with respect to a common point.

The invention further comprises determining a direction of rotation of the motor by the steps of determining a back emf voltage value at one motor terminal or switching node of the inverter with respect to the common point at an instant when the voltage at another motor terminal or switching node of the inverter goes through a predefined waveform point, e.g., a zero crossing; and from the value at the one motor terminal or switching node of the inverter, determining the direction of rotation.

DETAILED DESCRIPTION OF THE INVENTION

Figure 1:
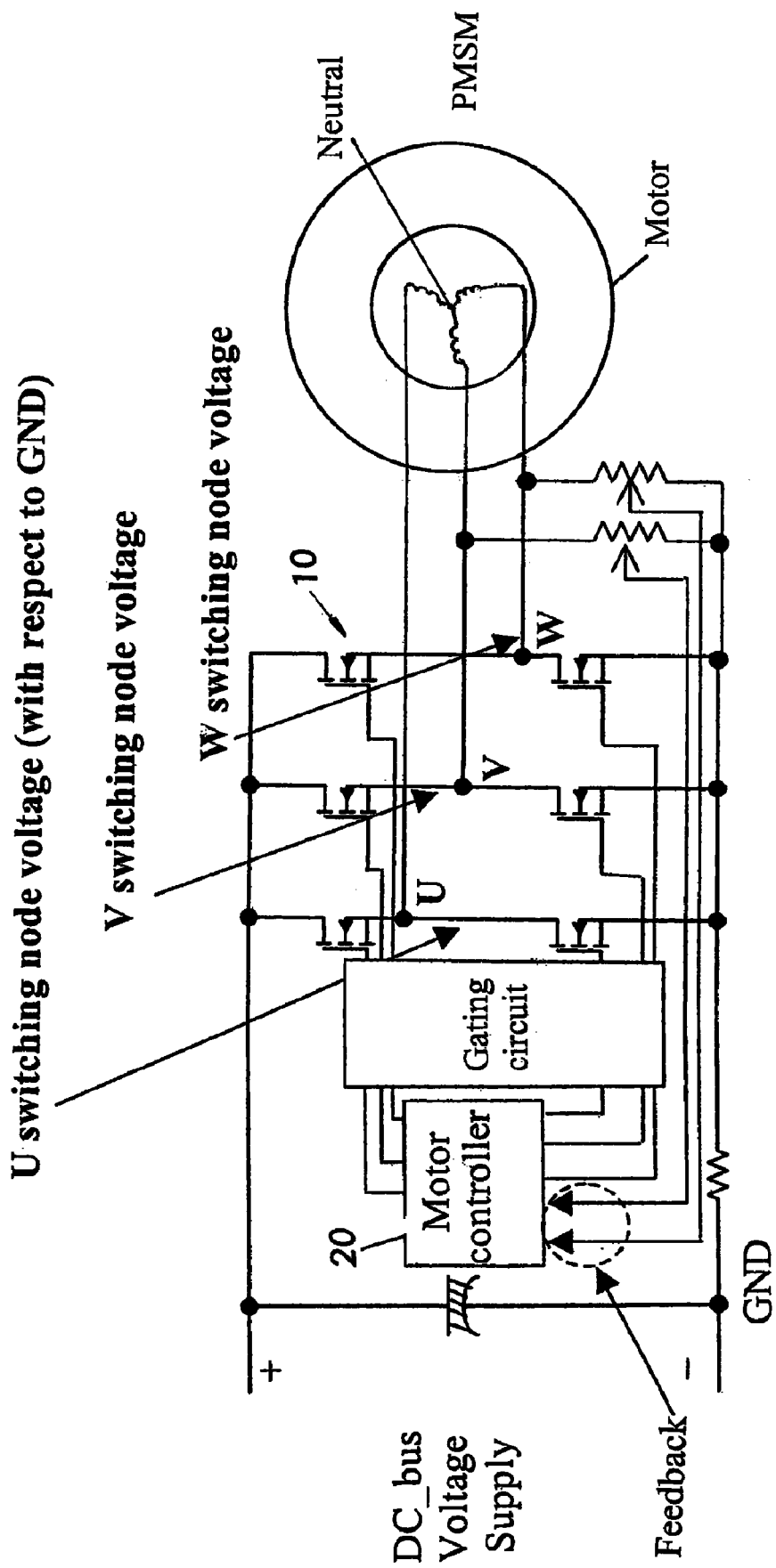
FIG. 1 is a block diagram of a PMSM controlled by a 3 phase switch-mode voltage source inverter.

A schematic of a typical motor drive is shown in FIG. 1. In this drive arrangement, power is supplied to the motor through 3-phase switch-mode inverter 10. The sensorless motor controller 20 is normally a digital controller, which receives feedback about motor variables through A/D converters.

Figure 2:
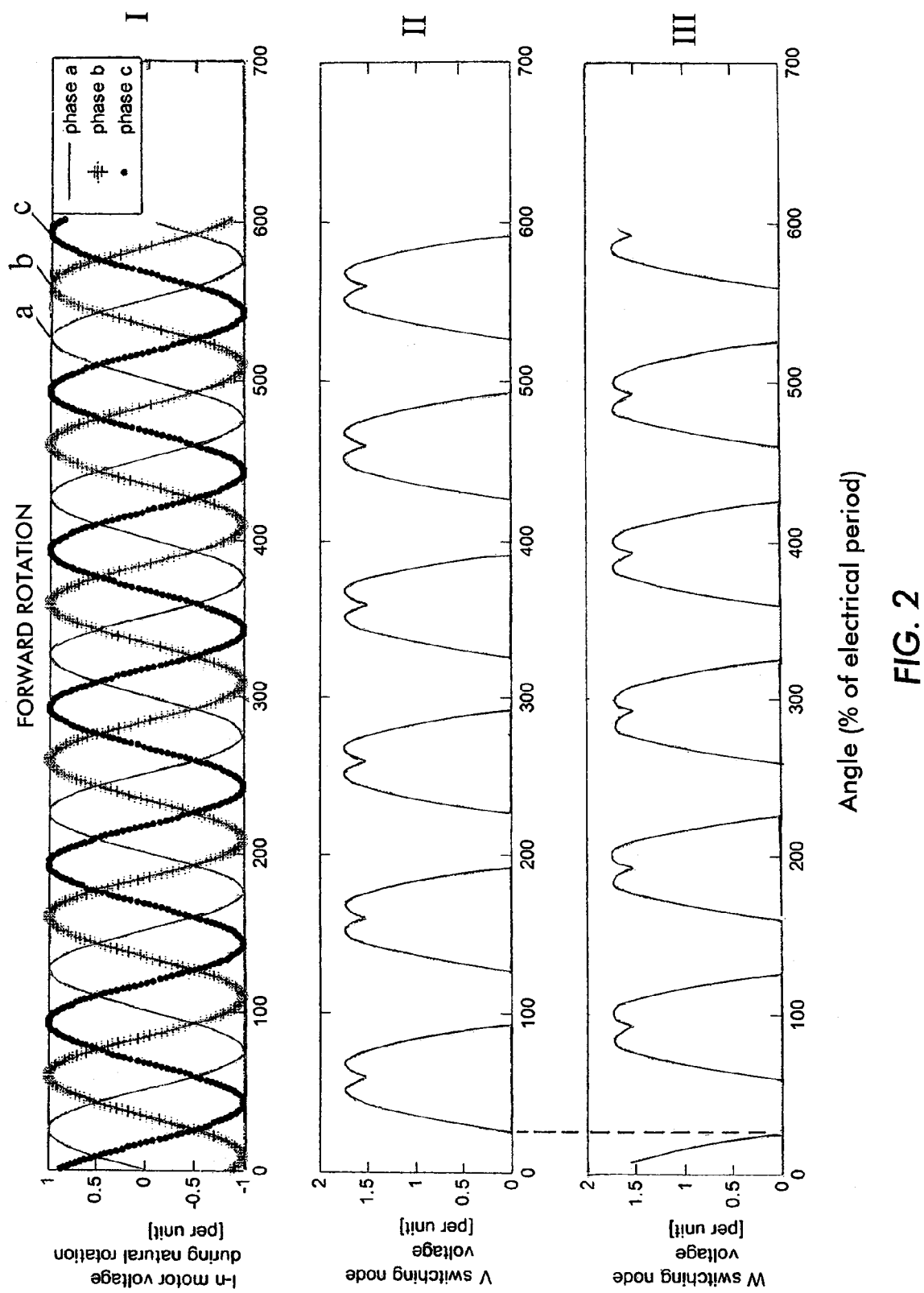
FIGS. 2, I, II and III show motor phase and switching node voltages for the motor naturally rotating in the forward direction.
Figure 3:
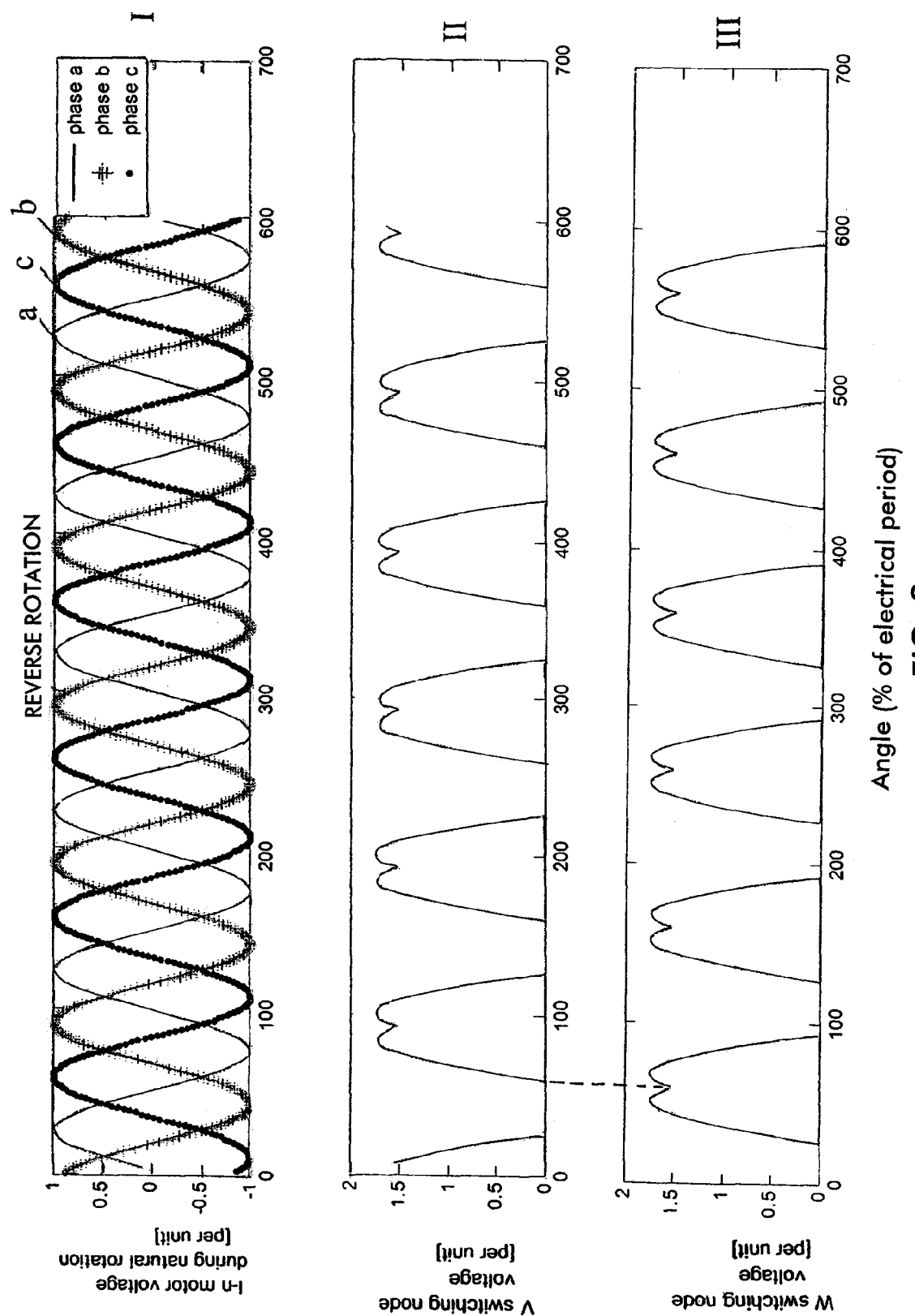
FIGS. 3, I, II, III shows motor phase and switching node voltages for the motor naturally rotating in the reverse direction.

When the synchronous motor is naturally rotating, there are voltages generated at the motor terminals (back emf). The frequency of the generated voltage is equal to the mechanical motor frequency multiplied by the number of motor pole pairs. Therefore, the motor's mechanical frequency (rotational speed in rpm) can be determined once the frequency of the generated voltage is known. Also, a phase relationship between generated phase voltages is different for different rotation directions. In particular, for one direction of rotation, c phase voltage will lag b phase voltage by 120 degrees (FIG. 2-I) and for the other direction c phase voltage will lead b voltage by 120 electrical degrees (FIG. 3-I). Voltages at switching nodes V and W (see FIG. 1) for different directions of rotation of the naturally rotating motor are shown in FIG. 2 and FIG. 3 at II and III. Node U is not shown as the relationship between only two nodes is all that is needed to determine the speed and direction according to the invention.

In FIGS. 2 and 3, I shows the line to neutral back emf phase voltages and II and III show phase V and W inverter switching node or motor terminal back emf with respect to the inverter ground (GND).

In order to determine the speed and direction of the naturally rotating motor without actually activating the inverter switches, information about voltage values at any two switching nodes is needed:

1) The electrical frequency of the drive is determined from the frequency of the back emf at a switching node voltage, where the frequency of a switching node voltage is determined based on the measured period between two consecutive upward zero-crossings. Mechanical motor frequency is equal to the electrical frequency divided by the number of motor pole pairs.

2) The direction of the rotation is determined based on the value of one switching node voltage at an instant when the other switching node voltage goes through upward zero-crossing. For example, as shown in FIG. 2 and FIG. 3, at instant of the upward zero-crossing of voltage at node V, voltage at node W is 0 in case of forward rotation (see dashed line in FIG. 2) and positive in case of reverse rotation (see dashed line in FIG. 3). Therefore based on the value at node W at this instant, the direction of the motor's rotation can be determined.

Instead of using upward zero-crossings, downward zero-crossings could also be used. It is also possible to use some other waveform point, but zero-crossings are preferable because of their ease of determination.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A method for substantially matching a frequency of an electronic drive inverter with a speed of rotation of an unpowered, coasting electric motor including a number of motor pole pairs without activating switches of said electronic drive inverter said method comprising:

determining an electrical frequency of a back emf signal generated at one of a terminal of the motor and a switching node of the inverter when the motor is coasting; and determining a mechanical motor frequency and thus said speed of rotation by dividing the electrical frequency by the number of motor pole pairs.

2. The method of claim 1, wherein the step of determining the electrical frequency comprises:

determining a time period between two successive waveform points of the back emf signal at one of said terminal of the motor, another terminal of said motor, and said switching node of the inverter with respect to a common point.

3. The method of claim 2, wherein the successive waveform points are successive upward or downward zero crossings of the back emf signal.

4. The method of claim 2, further comprising determining a direction of rotation of the motor by the steps of:

determining a back emf voltage value at one motor terminal or switching node of the inverter with respect to the common point at an instant when the voltage at another motor terminal or switching node of the inverter goes through a predefined waveform point; and from the value at the one motor terminal or switching node of the inverter, determining the direction of rotation.

5. The method of claim 4, wherein the predefined waveform point is a zero crossing.

6. The method of claim 5, wherein the value will be zero in one direction of rotation and positive for the other direction of rotation.

7. The method of claim 5, wherein the predefined zero crossing is either an upward or downward zero crossing.

8. A method for substantially matching a drive frequency of an active motor control with a speed of rotation of an unpowered, coasting Permanent Magnet Synchronous motor including a number of motor pole pairs, without engaging said active motor control, said method comprising:

monitoring a back emf signal generated at a terminal of said motor when said motor is coasting to determine an electrical frequency of said back emf signal; and determining said speed of rotation by dividing said electrical frequency by said number of motor pole pairs.

9. The method of claim 8, wherein determining said electrical frequency of said back emf signal comprises determining a time period between two successive waveform points of said back emf signal with respect to a common point.

10. The method of claim 9, wherein said successive waveform points comprise successive upward zero crossings of said back emf signal.

11. The method of claim 9, wherein said successive waveform points comprise successive downward zero crossings of said back emf signal.

12. The method of claim 9, further comprising determining a direction of rotation of said motor by:

determining a back emf voltage value at said terminal with respect to said common point when a voltage at a second motor terminal transitions through a predefined waveform point; and from said back emf voltage value at said terminal, determining said direction of rotation.

13. The method of claim 12, wherein said predefined waveform point comprises a zero crossing.

14. The method of claim 13, wherein said back emf voltage value is zero in one direction of rotation and positive for an opposite direction of rotation.

15. The method of claim 13, wherein said predefined zero crossing is one of an upward and a downward zero crossing.

* * * * *

UNITED STATES PATENT AND TRADEMARK OFFICE
CERTIFICATE OF CORRECTION

PATENT NO. : 7,965,053 B2
APPLICATION NO. : 12/041327
DATED : June 21, 2011
INVENTOR(S) : Ana Borisavljevic Page 1 of 1

It is certified that error appears in the above-identified patent and that said Letters Patent is hereby corrected as shown below:

In the claims, column 3, line 6, --,-- should be inserted immediately after "inverter".

Signed and Sealed this
Twentieth Day of December, 2011

David J. Kappos
*Director of the United States Patent and Trademark Office*